United States Patent
Zhang et al.

(10) Patent No.: US 10,356,845 B2
(45) Date of Patent: Jul. 16, 2019

(54) MOBILE STATION, REPEATER, TRUNKING COMMUNICATION SYSTEM AND METHOD THEREFOR

(71) Applicant: HYTERA COMMUNICATIONS CORPORATION LIMITED, Shenzhen (CN)

(72) Inventors: Yingzhe Zhang, Shenzhen (CN); Samuel Han Siong Chia, Shenzhen (CN); Yan Xu, Shenzhen (CN); Yuwang Tan, Shenzhen (CN); Zhenghua Luo, Shenzhen (CN)

(73) Assignee: Hytera Communication Corporation Limited, Shenzhen (CN)

( * ) Notice: Subject to any disclaimer, the term of this patent is extended or adjusted under 35 U.S.C. 154(b) by 410 days.

(21) Appl. No.: 15/129,074

(22) PCT Filed: Dec. 31, 2014

(86) PCT No.: PCT/CN2014/095997
§ 371 (c)(1),
(2) Date: Jan. 5, 2017

(87) PCT Pub. No.: WO2015/143916
PCT Pub. Date: Oct. 1, 2015

(65) Prior Publication Data
US 2018/0176984 A1    Jun. 21, 2018

(30) Foreign Application Priority Data
Mar. 26, 2014    (CN) .......................... 2014 1 0117883

(51) Int. Cl.
*H04W 88/04* (2009.01)
*H04W 76/50* (2018.01)
(Continued)

(52) U.S. Cl.
CPC ............. *H04W 88/04* (2013.01); *H04W 4/10* (2013.01); *H04W 48/20* (2013.01); *H04W 76/50* (2018.02);
(Continued)

(58) Field of Classification Search
CPC ....... H04W 88/04; H04W 76/50; H04W 4/10; H04W 48/20; H04W 76/45;
(Continued)

(56) References Cited

U.S. PATENT DOCUMENTS 6,529,486 B1 * 3/2003 Barnes .................. H04W 84/08
                                                         370/327
2002/0019222 A1 * 2/2002 Ezuriko ................ H04W 48/02
                                                         455/403

(Continued)

FOREIGN PATENT DOCUMENTS

| CN | 1674620 A | 9/2005 |
| CN | 101729698 A | 6/2010 |

(Continued)

OTHER PUBLICATIONS

The Extended European Search Report issued in the counterpart European application by the EPO, dated Aug. 9, 2017.
The CN1OA issued by SIPO dated Jul. 3, 2017.

*Primary Examiner* — Kibrom T Hailu
(74) *Attorney, Agent, or Firm* — Yunling Ren

(57) ABSTRACT

A communication method for a mobile station comprises: monitoring broadcast information sent by a currently-residing repeater, wherein the broadcast information carries state information of repeaters within a site and call related information, and a main repeater of the mobile station belongs to the site; acquiring a state of the main repeater according to the broadcast information; determining whether there is a call belonging to the mobile station according to the call related information; and when determining that there is a
(Continued)

call belonging to the mobile station, performing handover, according to the call related information, to a repeater corresponding to the call belonging to the mobile station to access the call.

11 Claims, 13 Drawing Sheets

(51) Int. Cl.
*H04W 4/10* (2009.01)
*H04W 48/20* (2009.01)
*H04W 84/04* (2009.01)
*H04W 84/08* (2009.01)
*H04W 76/45* (2018.01)

(52) U.S. Cl.
CPC .......... *H04W 76/45* (2018.02); *H04W 84/047* (2013.01); *H04W 84/08* (2013.01)

(58) Field of Classification Search
CPC ... H04W 84/047; H04W 84/08; H04W 40/22; H04L 25/20; H04L 12/4604
See application file for complete search history.

(56) References Cited

U.S. PATENT DOCUMENTS

| | | | |
|---|---|---|---|
| 2010/0087199 A1* | 4/2010 | Chowdhary | H04W 72/005 455/450 |
| 2010/0279726 A1 | 11/2010 | Bohn et al. | |
| 2013/0122899 A1 | 5/2013 | Panpaliya et al. | |

FOREIGN PATENT DOCUMENTS

| | | |
|---|---|---|
| CN | 102083088 A | 6/2011 |
| CN | 102187723 A | 9/2011 |
| WO | WO-2011121714 A1 | 10/2011 |

* cited by examiner

| Serial Number | Site State Opcode |
|---|---|
| Manufacturer Identifier ||
| Free Repeater Number | Repeater 1 State Information |
| Repeater 2 State Information | Repeater 3 State Information |
| Repeater 1 Call Address ||
| Repeater 2 Call Address ||
| Repeater 3 Call Address ||

Fig.3

| | Short Link Control Opcode |
|---|---|
| Manufacturer Identifier | |
| Free Repeater Number | Priority Call Repeater Number |
| Priority Call Compressed Address | |

Fig.4

| PF | R | Full Link Control Opcode | | |
|---|---|---|---|---|
| Manufacturer Identifier ||||||
| Emergency Call | Reserved | Broadcast Call | OVCM | Priority Level |
| Free Repeater Number || Priority Call Repeater Number |||
| Target Address |||||
| Priority Call Compressed Address |||||
| Source Address |||||

Fig.5

| LB | PF | Control Signaling Block Opcode |
|---|---|---|
| | | Manufacturer Identifier |

| Data/CSBK | G/I | Preserved |
|---|---|---|

| Number of Control Signaling Blocks Followed |
|---|

| Free Repeater Number | Priority Call Repeater Number |
|---|---|

| Target Address |
|---|
| Priority Call Compressed Address |
| Source Address |

Fig.6

| PF | R | Full Link Control Opcode |
|---|---|---|
| | | Manufacturer Identifier |

| Busy Repeater No. 1 Call Type | Busy Repeater No. 2 Call Type | Busy Repeater No. 1 |
|---|---|---|
| Busy Repeater No. 2 | | Priority Call Repeater Number |
| Target Address 1 | | |
| Priority Call Compressed Address | | |
| Target Address 2 | | |

Fig.11

MOBILE STATION, REPEATER, TRUNKING COMMUNICATION SYSTEM AND METHOD THEREFOR

CROSS REFERENCE

The present disclosure is the 371 application of PCT Application No. PCT/CN2014/095997 filed Dec. 31, 2014, which is based on and claims priority to Chinese Patent Application No. 201410117883.4, filed Mar. 26, 2014, the entire contents of which are incorporated herein by reference.

TECHNICAL FIELD

The present disclosure relates to the filed of digital communication, and more particularly, to a mobile station in a trunking communication system, a repeater, as well as a trunking communication system and a method thereof.

BACKGROUND

Trunking communication systems are mainly used in the field of specialized mobile communication. Available channels of the systems may be shared by all users within the system, having a function of automatically selecting channels. The systems are multipurpose and high-efficiency digital dispatch communication systems capable of sharing resources, sharing the expenses, and sharing channels and services.

According to different dispatch control modes, the trunking communication systems may be classified into centralized trunking communication systems and distributed trunking communication systems. The centralized trunking communication system have specialized control channels and control centers. In an idle state, mobile stations always monitor the control channels, and at ordinary times the control channels maintain long emission states. Every time when a conversation is required, the mobile stations need to send requests to the systems on control channels, waiting for the systems to allocate required service channels. The mobile station is switched to allocated service channels to communicate, and then return to the control channels upon completion of communication. The systems carry out centralized management and allocation of service channel resources through a control center.

The distributed trunking communication systems generally have no dedicated control channel. Any channel in the systems may serve as a service channel and achieve corresponding management and control functions. The mobile station may reside on any channel to communicate.

Due to centralized management of channel resources, the centralized trunking communication systems may better implement sharing and allocation of channel resources and improve a utilization factor of the channel resources. However, to a certain extent the channel resources are wasted because dedicated control channels are required. In addition, this solution is very high in construction and maintenance cost, far beyond bearing capability of many mid-to-low level and small-scale clients.

The distributed trunking communication systems are moderate on scale, low in cost, and needless of dedicated control channels, but need to solve a problem of channel resource allocation and sharing because of having no dedicated control center. Although at present Motorala's Capacity Plus solution solves the problem of channel resource sharing, but a key technology thereof is that a rest channel needs to be set up so that all mobile stations not participating into calls may reside on the rest channel to monitor to ensure called mobile stations may be timely paged. Since all the mobile stations monitor on the rest channel, when a plurality of mobile stations simultaneously launch an access on the rest channel, an access failure may be caused due to collision.

This section provides background information related to the present disclosure which is not necessarily prior art.

SUMMARY

The present disclosure provides a mobile station, a repeater, a trunking communication system and a method thereof, which may allow a system to further improve a call access success rate based on channel resource sharing.

Additional aspects and advantages of the present disclosure will partially be set forth in the following description and will partially become apparent from the description, or may be realized by the practice of the present disclosure.

According to one aspect of the present disclosure, there is provided a communication method for a mobile station, used in a trunking communication system and including: monitoring broadcast information sent by a currently-residing repeater, wherein the broadcast information carries state information of repeaters within a site and call related information, and a main repeater of the mobile station belongs to the site; acquiring a state of the main repeater according to the broadcast information, wherein when the main repeater is idle, the currently-residing repeater serves as the main repeater, and when the main repeater is busy, the currently-residing repeater serves as a free repeater, the free repeater being a predetermined repeater with an idle state within the site; determining whether there is a call belonging to the mobile station according to the call related information; and when determining that there is a call belonging to the mobile station, performing handover, according to the call related information, to a repeater corresponding to the call belonging to the mobile station to access the call.

According to another aspect of the present disclosure, there is provided a communication method for a repeater, used in a trunking communication system and including: generating broadcast information according to states of repeaters within a site to which the repeater belongs and call related information; and sending the broadcast information carrying state information of the repeaters within the site to which the repeater belongs and the call related information, so that a mobile station monitoring the repeater determines the states of the repeaters within the site according to the state information of the repeaters and executes call access related operations according to the call related information.

According to still another aspect of the present disclosure, there is provided a mobile station, used in a trunking communication system and including: a monitoring unit configured to monitor broadcast information sent by a currently-residing repeater where the mobile station currently resides, wherein the broadcast information carries state information of repeaters within a site and call related information, and a main repeater of the mobile station belongs to the site; a determining unit configured to: receive the broadcast information sent by the monitoring unit and acquire a state of the main repeater according to the broadcast information, wherein when the main repeater is idle, the currently-residing repeater serves as the main repeater, and when the main repeater is busy, the currently-residing repeater serves as a free repeater, the free repeater being a predetermined repeater with an idle state within the site;

determine whether there is a call belonging to the mobile station according to the call related information; and send positioning information and an access indication when there is a call belonging to the mobile station; and an access unit, configured to receive the positioning information and the access indication sent by the determining unit, and perform, according to the positioning information and the access indication, handover to a repeater corresponding to the call belonging to the mobile station to access the call.

According to still another aspect of the present disclosure, there is provided a repeater, used in a trunking communication system and including: a generating unit configured to generate broadcast information according to states of repeaters within a site to which the repeater belongs and call related information; and an information sending unit configured to send the broadcast information carrying state information of the repeaters within the site to which the repeater belongs and the call related information, so that a mobile station monitoring the repeater determines the states of the repeaters within the site according to the state information of the repeaters and executes call access related operations according to the call related information.

According to still another aspect of the present disclosure, there is provided a mobile station, used in a trunking communication system and including: a processor, and a memory configured to store instructions executable by the processor; where the processor is configured to: monitor broadcast information sent by a currently-residing repeater, wherein the broadcast information carries state information of repeaters within a site and call related information, and a main repeater of the mobile station belongs to the site; acquire a state of the main repeater according to the broadcast information, wherein when the main repeater is idle, the currently-residing repeater serves as the main repeater, and when the main repeater is busy, the currently-residing repeater serves as a free repeater, the free repeater being a predetermined repeater with an idle state within the site; determine whether there is a call belonging to the mobile station according to the call related information; and when determining that there is a call belonging to the mobile station, perform handover, according to the call related information, to a repeater corresponding to the call belonging to the mobile station to access the call.

According to still another aspect of the present disclosure, there is provided a repeater, used in a trunking communication system and including: a processor, and a memory configured to store instructions executable by the processor; where the processor is configured to: generate broadcast information according to states of repeaters within a site to which the repeater belongs and call related information, and send the broadcast information carrying state information of the repeaters within the site to which the repeater belongs and the call related information, so that a mobile station monitoring the repeater determines the states of the repeaters within the site according to the state information of the repeaters and executes call access related operations according to the call related information.

According to the present disclosure, by designing various broadcast information and broadcast the information for different scenarios, the call information may be acquired by the mobile station under any circumstances and under any repeater to accurately position and access a call of the repeater, reduce a possibility of call lose, allow a system to support multi-call at the same moment and reduce a probability of system access conflict.

This section provides a summary of various implementations or examples of the technology described in the disclosure, and is not a comprehensive disclosure of the full scope or all features of the disclosed technology.

BRIEF DESCRIPTION OF THE DRAWINGS

The above and other features and advantages of the present disclosure will become more apparent from the detailed description of an exemplary embodiment with reference to the drawings.

FIG. 3 illustrates a schematic diagram of site status information according to an embodiment of the present disclosure;

FIG. 4 illustrates a schematic diagram of priority call information sent by using a short LC proprietary signaling of an embedded CACH according to an embodiment of the present disclosure;

FIG. 5 illustrates a schematic diagram of priority call information sent by using a voice link control header according to an embodiment of the present disclosure;

FIG. 6 illustrates a schematic diagram of priority call information sent by using pre-carrier signaling (PreCSBK) according to an embodiment of the present disclosure;

FIG. 11 illustrates a schematic structural diagram of a voice embedded signaling according to an embodiment of the present disclosure;

DETAILED DESCRIPTION

An exemplary embodiment will be described more comprehensively with reference to the accompanying drawings. However, the exemplary embodiment may be carried out in various manners, and shall not be interpreted as being limited to the embodiment set forth herein; instead, providing these embodiments will make the present disclosure more comprehensive and complete, and will fully convey the conception of the exemplary embodiment to those skilled in the art.

Characteristics, features or structures as described may be incorporated into one or more embodiments in any right way. In the following description, many specific details are provided to facilitate sufficient understanding of an embodiment of the present disclosure. However, those skilled in the art shall appreciate that the technical solutions in the present disclosure may be practiced without one or more of the specific details, or other methods or structures and so on may be employed. In other circumstances, well-known structures or methods are not shown or described in detail to avoid confusion of the present disclosure.

Figure 1:
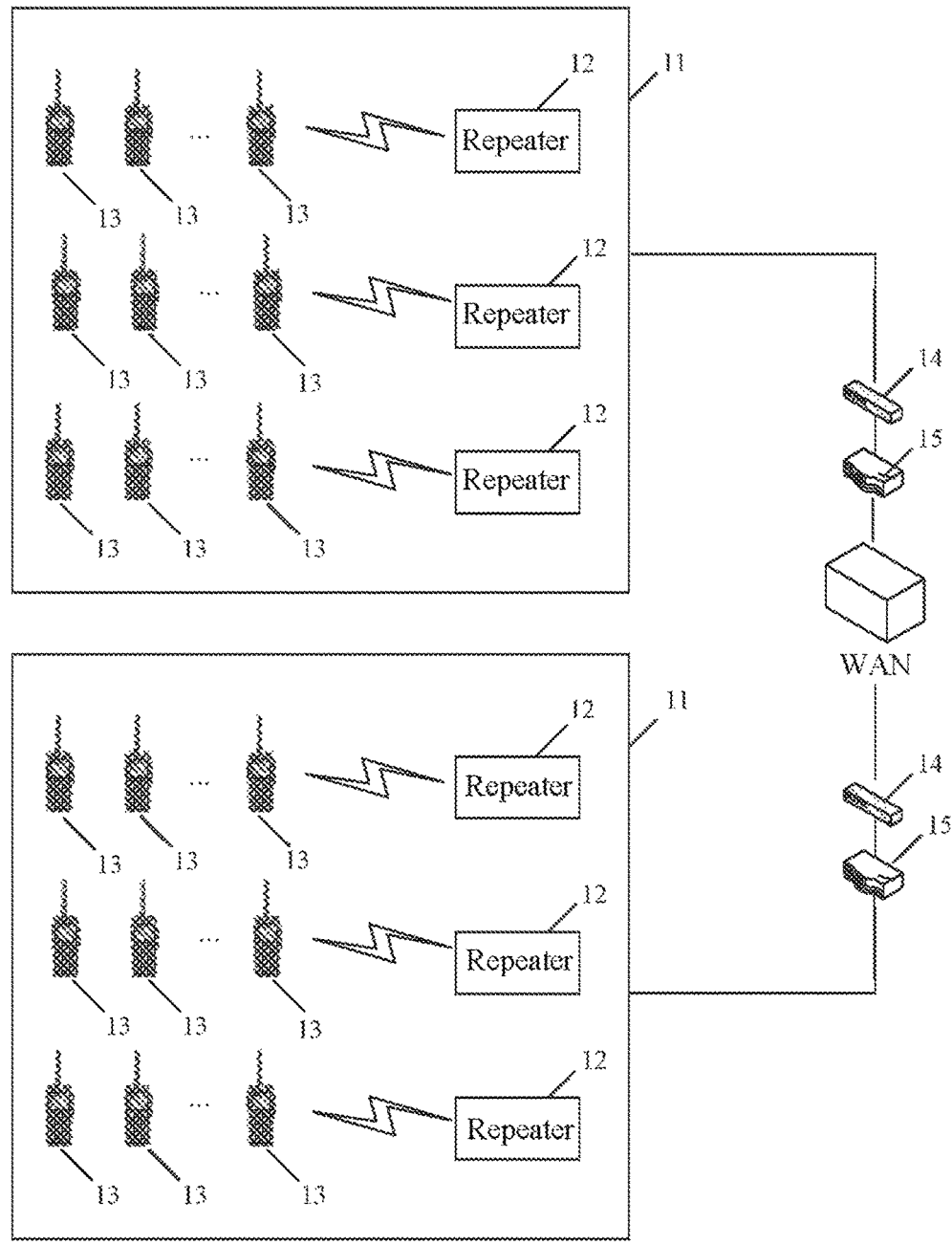
FIG. 1 illustrates a block diagram of a digital communication system according to an embodiment of the present disclosure.

FIG. 1 illustrates a schematic diagram of a digital communication system according to an embodiment of the present disclosure. As shown in FIG. 1, the digital communication system 10 includes: at least one site 11, a plurality of repeaters 12 and a plurality of mobile stations 13.

The site 11 is a set consisting of the repeaters 12 and the mobile stations 13, which may be, for example, a network site. Each site 11 is associated with different (but possibly overlapped) geographical coverage areas. Each site 11 may include a plurality of repeaters 12. In each site 11, the repeaters 12 are respectively connected to a wide area network (WAN) or a local area network (LAN) through network devices such as switches 14 or routers 15 and so on. Each repeater 12 sends or receives control signaling and user data (data/voice/video/image/text and so on) to or from one or more mobile stations 13 on one or more channels. In a time division multiple access system, a channel includes a frequency and a slot.

Each repeater 12 may represents an idle state and a busy state. If a repeater 12 has an idle slot, the repeater 12 is in the idle state; otherwise, the repeater is in the busy state. For example, in a digital mobile radio (DMR) system in a two-slot mode, when at least one slot is idle, the repeater 12 is considered to have an idle slot, namely, be in an idle state. On the contrary, when both two slots are occupied, the repeater is considered to be in a busy state.

In one site 11, a plurality of mobile stations 13 may be divided into at least one talkgroup, where each talkgroup has one main repeater. In the site 11, any repeater may serve as a main repeater in different talkgroups, which may be equally distributed to different main repeaters. When a main repeater within the site is in an idle state (idle slot), a mobile station in the talkgroup always monitors the main repeater.

Any repeater whose state is idle may be selected as a free repeater. In each site 11, only one free repeater exists at the same moment. Other repeaters in an idle state not designated as free repeaters are defined as idle repeaters. An idle repeater may be designated as a new free repeater at any time. When an idle repeater does not receive any uplink information, the idle repeater may periodically enter into an awakening stage to broadcast proprietary signaling information (referring to the site state information as shown in FIG. 3).

When all slots (for example, to a DMR 2-slot mode, a repeater includes two slots) on one repeater are occupied, the repeater is in a busy state, which is referred to as a busy repeater. If a mobile station resides on the busy repeater does not participate into a call, the busy repeater needs to be automatically switched to a free repeater to monitor.

In one site 11, a mobile station 13 not making call always monitors the main repeater in a talkgroup to which the mobile station belongs. When the main repeater in a talkgroup to which the mobile station belongs turns to a busy state, the mobile station 13 is switched to a free repeater in the site 11 to continue monitoring. When the main repeater in a talkgroup to which the mobile station belongs turns to an idle state again, the mobile station 13 immediately returns to the main repeater in a talkgroup to which the mobile station belongs to continue monitoring.

When monitoring that there is a call belonging to the mobile station on any repeater, the mobile station 13 may also be immediately switched to the repeater for a call access.

According to the communication system of the present disclosure, by designing to broadcast various signalings in different scenarios, an objective of timely informing a mobile station to acquire call information in any case may be achieved, without limiting an awaiting and monitoring a location of the mobile station. At ordinary times, the mobile station may reside on any channel, which may quickly position and access a call of the mobile station and improve a reliability of the call.

According to the present disclosure, the mobile station may await on different repeaters. At any time when a call is generated on other repeaters, the mobile station may be timely switched to a corresponding repeater to access the call. This may be achieved by embedding various broadcast control information in different cases.

Figure 2:
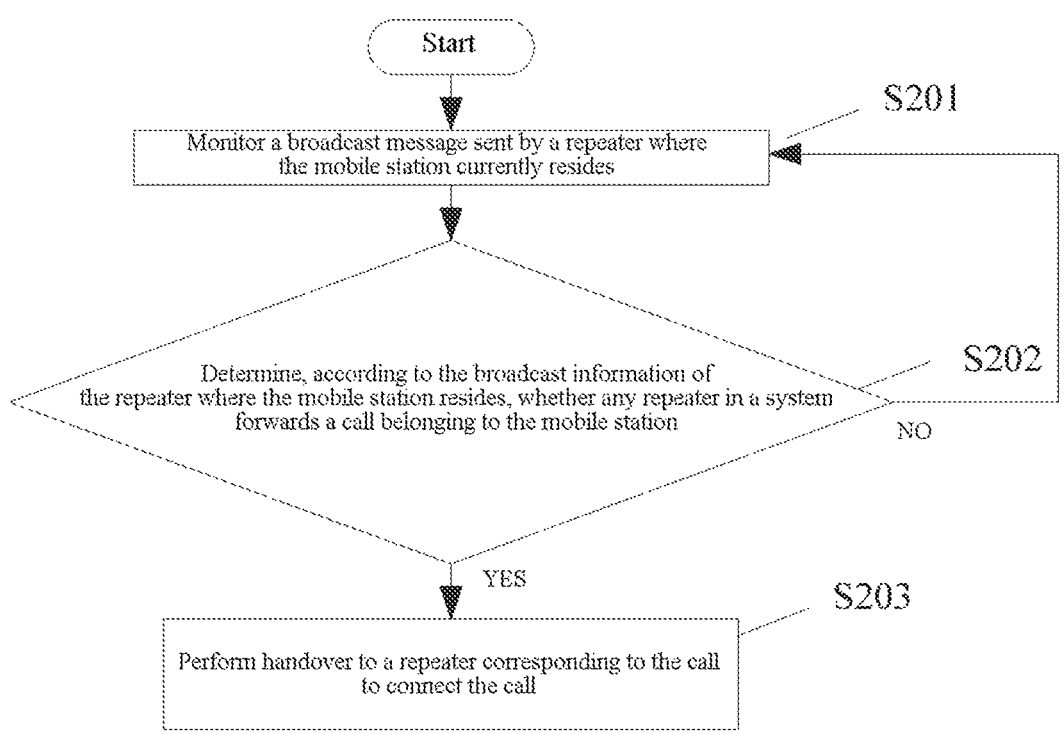
FIG. 2 illustrates a flowchart of a method for call positioning and accessing according to an embodiment of the present disclosure.

FIG. 2 illustrates a flowchart of a method for call positioning and accessing according to an embodiment of the present disclosure.

As shown in FIG. 2, in Step S201, a mobile station monitors broadcast information of a currently-residing repeater.

According to an embodiment of the present disclosure, the broadcast information includes site state information and priority call information so as to receive an ordinary call/a priority call when not participating in a call.

The site state information is used for broadcasting service state information of all repeaters within a site and call target address information so that a mobile station subordinated to the site may learn about communication of all the repeaters within the site, and may timely learn whether there is a call belonging to the mobile station within the current site so that the mobile station may quickly perform handover to a repeater (the repeater forwarding the call) corresponding to the call to access the call, thereby avoiding call lose. The site state information may be, for example, broadcast periodically.

FIG. 3 illustrates a schematic diagram of site state information according to an embodiment of the present disclosure. As shown in FIG. 3, a site state information protocol data unit (PDU) may include, for example, an information element (IE) as follow.

TABLE 1

| Information Element (IE) | Length | Value | Remark |
|---|---|---|---|
| Serial Number (SN) | 2-bit | 0 | Indicating logic channels CH1~CH6 in repeaters R1-R3 within a site |
| | | 1 | Indicating logic channels CH7~CH12 in repeaters R4-R6 within the site |
| | | 2 | Indicating logic channels CH13~CH18 in repeaters R7-R9 within the site |
| | | 3 | Reserved |
| Site State Opcode | 6-bit | 0x0A | Site state information operation code |
| MFID | 8-bit | 0x68 | Characteristic ID identification code |
| Free Repeater Num | 4-bit | 0 | Indicating that all repeaters within the site are in busy state |
| | | 1-15 | Indicating an index number of a current free repeater |
| Repeater1 state | 4-bit | | See Table 2 |
| Repeater2 state | 4-bit | | See Table 2 |
| Repeater3 state | 4-bit | | See Table 2 |
| Repeater1 target address | 16-bit | | See Table 3 |
| Repeater2 target address | 16-bit | | See Table 3 |
| Repeater3 target address | 16-bit | | See Table 3 |

TABLE 2

| IE | Length | Value | Remark |
|---|---|---|---|
| TimeSlot1.State | 1-bit | 0 | Indicating a logic channel 1 is idle |
| | | 1 | Indicating the logic channel 1 is busy |
| TimeSlot1.Activity | 1-bit | 0 | There is activated individual call on slot 1 |
| | | 1 | There is activated group call on slot 1 |
| TimeSlot2.State | 1-bit | 0 | Indicating a logic channel 2 is idle |
| | | 1 | Indicating the logic channel 2 is busy |
| TimeSlot2.Activity | 1-bit | 0 | There is activated individual call on slot 2 |
| | | 1 | There is activated group call on slot 2 |

TABLE 3

| IE | Length | Value | Remark |
|---|---|---|---|
| TimeSlot1.HashedAddress | 8-bit | 0~255 | Compressed target address on slot 1 |
| TimeSlot2.HashedAddress | 8-bit | 0~255 | Compressed target address on slot 2 |

The priority call information is used for broadcasting call information having a higher priority. For example, in a DMR system, the priority call information may be broadcast in a short link control (LC) proprietary signaling embedded in a common announcement channel (CACH).

For example, in the DMR system, a short LC proprietary signaling is sent after being embedded into a CACH, and one short LC proprietary signaling may be decoded every four CACHes are received. The repeater may always send CACH signalings no matter what kind of service is being processed by the repeater.

According to an embodiment of the present disclosure, under a premise of remaining basic information of a DMR air-interface frame unchanged, carrying of additional proprietary signaling information is increased by shortening a scope of bit address information. For example, by using a compressed 8-bit source address and a target address, the free repeater and priority call information are limited to 16 bits.

FIG. 4 illustrates a schematic diagram of priority call information sent by using a short LC proprietary signaling embedded into a CACH according to an embodiment of the present disclosure. As shown in Table 4, the short LC signaling PDU may include, for example, IE as below.

TABLE 4

| IE | Length | Value | Remark |
|---|---|---|---|
| SLCO | 4-bit | 0x08 | Short link control opcode |
| Manufacturer Identifier (MFID) | 8-bit | 0x68 | Characteristic ID identification code |
| Free Repeater Num | 4-bit | 0 | Indicating that all repeaters within the site are in busy state |
| | | 1-15 | Indicating an index number of a current free repeater |
| PriCall.RptNum | 4-bit | 1-15 | Indicating an index number of a repeater forwarding a priority call |
| PriCall.HashedAddress | 8-bit | 0-255 | Indicating a compressed target address of a 8-bit priority call |

According to the present disclosure, as long as there is an idle repeater in a system, a mobile station in the same talkgroup may always find a free repeater (a main repeater or a free repeater) where the mobile station may reside. The free repeater may periodically broadcast call state information of all repeaters and forwarded call addresses by means of site state information. When the repeater is awaked, the repeater may always broadcast priority call information in a short LC proprietary signaling in a CACH. If the mobile station detects that there is a call belonging to the mobile station by receiving the above broadcast information, the mobile station may be immediately switched to a corresponding repeater to access the call belonging to the mobile station. In this way, the mobile station may receive an ordinary call/priority call when not participating in a call.

When the currently-residing repeater where the mobile station currently resides is busy and thus is unable to continue broadcasting site state information and the mobile station does not need to participate in a service being forwarded on the repeater, the mobile station may be switched to a free repeater and resides thereon according to a free repeater number embedded in a service signaling, and then continue learning about services on a current channel through site state information on the free repeater and the short LC proprietary signaling in the CACH.

The solutions of the present disclosure allow the mobile station to execute a call scanning and timely position and access a call belonging to the mobile station no matter which repeater where the mobile station resides. When a call state is changed, site state information may be timely updated among repeaters to ensure that the mobile station may obtain correct call information at any moment.

According to embodiments of the present disclosure, a process of sending broadcast information in a system may be as below.

Site state information and short LC proprietary signaling information have always been sent when no service information needs to be sent after the repeater is awaked.

A site state signal timer is started after the repeater is dormant. After the time, the site state information and the short LC proprietary signaling information are automatically started to send out.

All the repeaters may be awaked right away and the site state information and the short LC proprietary signaling information are sent out when individual call, general call or emergency call services are generated.

When a group call service is generated, a main repeater in which this group of members resides is awaked and the site state information and the short LC proprietary signaling information are sent out.

According to another embodiment of the present disclosure, when a mobile station is in a call-in-progress state, the mobile station may further continue monitoring the priority call information broadcast after being embedded into a service signaling, thereby timely positioning and accessing a call having a higher priority.

Still taking the DMR system as an example, according to an embodiment of the present disclosure, the priority call information may be, for example, additional control information embedded into a DMR service signaling such as a short link control (LC) signaling embedded into a CACH, a voice link control (LC) header or a PreCSBK and so on.

The method for the sending priority call information by means of the short LC proprietary signaling information embedded into the CACH is described through FIG. 4 and Table 4, and thus is not unnecessarily elaborated herein.

The priority call information may also be sent by means of voice LC proprietary signaling information embedded into a voice link control header. Every time when establishing a voice service, namely before transmitting voice data, one or more voice LC headers may be sent.

FIG. 5 illustrates a schematic diagram of priority call information sent by using a voice link control header according to an embodiment of the present disclosure. As shown in Table 5, the voice LC header PDU may include, for example, an IE as below.

TABLE 5

| IE | Length | Value | Remark |
| --- | --- | --- | --- |
| Protection flag (PF) | 1-bit | 0 | Reserved bit, default as 0 |
| Preserved (R) | 1-bit | 0 | Reserved bit, default as 0 |
| Full link control opcode (FLCO) | 6-bit | 0-63 | Group call: 000000 Individual call: 000011 End of data: 110000 |
| MFID | 8-bit | 0x68 | Characteristic ID identification code |
| Emergency | 1-bit | 0/1 | 0: Non-emergency call 1: Emergency call |
| Reserved | 3-bit | | Reserved bit |
| Broadcast | 1-bit | 0/1 | 0: Non-broadcast call 1: Broadcast call |
| Open Voice Call Mode (OVCM) | 1-bit | 0/1 | 0: Non-open channel call 1: Open channel call |
| Priority Level | 2-bit | | 00: No priority 01: Priority 1 10: Priority 2 11: Priority 3 |
| Free Repeater Num | 4-bit | 0 | Indicating that all repeaters within the site are in busy state |
| | | 1-15 | Indicating an index number of a current free repeater |
| PriCall.RptNum | 4-bit | 1-15 | Indicating an index number of a repeater forwarding a priority call |
| Target Address | 16-bit | 1-65535 | Called target address |
| PriCall.HashedAddress | 8-bit | 0-255 | Indicating a compressed target address of a 8-bit priority call |
| Source Address | 16-bit | 1-65535 | Called source address |

The priority call information may also be sent by means of proprietary signaling information embedded into a PreCSBK. Every time when establishing data and signaling services, namely before transmitting actual data packets or signalings, one or more PreCSBKs may be sent.

FIG. 6 illustrates a schematic diagram of priority call information sent by using PreCSBK according to an embodiment of the present disclosure. As shown in Table 6, the PreCSBK PDU may include, for example, IE as below.

TABLE 6

| IE | Length | Value | Remark |
| --- | --- | --- | --- |
| Last block (LB) | 1-bit | 0/1 | The value is 1 when it is a last block of Control Signaling Block (CSBK) or Multiple Block Control (MBC) packets |
| Protection flag (PF) | 1-bit | 0 | Reserved bit, default as 0 |
| CSBKO | 6-bit | 0x3d | Control signaling block opcode |
| MFID | 8-bit | 0x68 | Characteristic ID identification code |
| Data/CSBK | 1-bit | 0 | Control signaling frame followed by PreCSBK |
| | | 1 | Data followed by PreCSBK |
| G/I | 1-bit | 0 | Individual call |
| | | 1 | Group call |

TABLE 6-continued

| IE | Length | Value | Remark |
| --- | --- | --- | --- |
| Preserved (R) | 6-bit | 0 | Reserved bit, default as 0 |
| (CBF) | 8-bit | 0-31 | Number of control signaling blocks followed by current PreCSBK |
| Free Repeater Num | 4-bit | 0 | Indicating that all repeaters within the site are in busy state |
| | | 1-15 | Indicating an index number of a current free repeater |
| PriCall.RptNum | 4-bit | 1-15 | Indicating an index number of a repeater forwarding a priority call |
| Target Address | 16-bit | 1-65535 | Called target address |
| PriCall.HashedAddress | 8-bit | 0-255 | Indicating a compressed target address of a 8-bit priority call |
| Source Address | 16-bit | 1-65535 | Called source address |

By embedding information such as a free repeater number, a priority call repeater number and priority call target address information into the above signalings, call information having a higher priority may be obtained no matter the mobile station resides in any repeater or whether the repeater is busy. The mobile station may be timely switched to a corresponding repeater to execute a priority call access according to service conditions thereof.

According to another embodiment of the present disclosure, the broadcast information includes call address information and/or priority call information. The call address information may be embedded into an embedded signaling in voice, and as previously mentioned, the priority call information may be embedded into a short LC signaling of the CACH. Thus, when all channels within a site are busy, the mobile station may also quickly position and access an ordinary call/priority call.

When all the repeaters within the site are busy, all the repeaters forward service information and thus are unable to timely broadcast site state information. At this time, mobile stations not participating into services are unable to acquire service conditions of other repeaters. In a conventional method, only a method of scanning may be used to search whether services of the repeaters are present. When there are more repeaters within the site, a search process of the conventional method is lower in efficiency. In this case, a probability of call lose is also very high.

According to the embodiments of the present disclosure, when the mobile station discovers that all the repeaters within the site are busy, for example, the mobile station detects that "a free repeater number" IE is 0, the mobile station may start a busy system scan. At this time, the repeaters need to alternately fill call information occurred on the repeater and other repeaters into the embedded signaling in voice. FIG. 11 illustrates a schematic structural diagram of an embedded signaling in voice according to an embodiment of the present disclosure, specifically filled information definition is as shown in Table 7. A terminal may determine whether all the repeaters within the site are busy by resolving "a free repeater number" IE in the site state information. The mobile station may continue monitoring the currently-residing cell and obtain call address information belonging to the mobile station and a repeater number to position and access a call belonging to the mobile station by resolving an embedded signaling in voice.

TABLE 7

| IE | Length | Value | Remark |
| --- | --- | --- | --- |
| Protection flag (PF) | 1-bit | 0 | Reserved bit, default as 0 |
| Reserved (R) | 1-bit | 0 | Reserved bit, default as 0 |
| Full link control opcode (FLCO) | 6-bit | 0-63 | Channel all busy: 110001 |
| MFID | 8-bit | 0x68 | Characteristic ID identification code |
| Busy repeater1 call type | 2-bit | 0-3 | 00: There is activated individual call on slot 1<br>01: There is activated group call on slot 1<br>10: There is activated individual call on slot 2<br>11: There is activated group call on slot 2 |
| Busy repeater2 call type | 2-bit | 0-3 | 00: There is activated individual call on slot 1<br>01: There is activated group call on slot 1<br>10: There is activated individual call on slot 2<br>11: There is activated group call on slot 2 |
| Other Busy Repeater Num1 | 4-bit | 1-15 | Indicating index numbers of other busy repeaters |
| Other Busy Repeater Num2 | 4-bit | 1-15 | Indicating index numbers of other busy repeaters |
| PriCall.RptNum | 4-bit | 1-15 | Indicating an index number of a repeater forwarding a priority call |
| Target Address1 | 16-bit | | Target address of other busy repeater number 1, specifically see Table3 |
| PriCall.HashedAddress | 8-bit | 0-255 | Indicating a compressed target address of a 8-bit priority call |
| Target Address2 | 16-bit | | Target address of other busy repeater number 2, specifically see Table3 |

Taking a DMR system as an example, according to an embodiment of the present disclosure, when all the repeaters within the site are busy and the repeaters forward voice services, embedded signaling in voice alternately carries call information occurred on the repeater and other repeaters within the site so that the mobile station residing on the repeater may quickly position a call belonging to the mobile station without switching a channel. For example, when all the repeaters within the site are busy, contents of Table 5 and Table 7 need to be alternately filled into the voice embedded signaling, a terminal determines how to resolve subsequent information contents according to a FLCO domain in Table 5 and Table 7.

Figure 7:
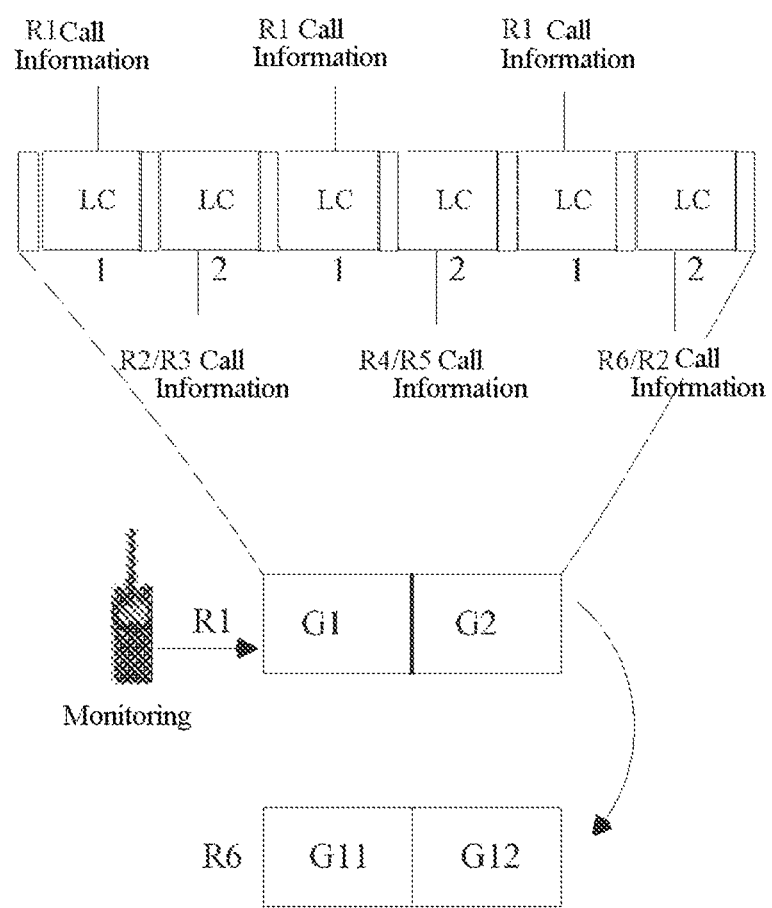
FIG. 7 illustrates a schematic diagram of a mobile station quickly positioning a mobile station when all repeaters within a site are busy according to an embodiment of the present disclosure.

FIG. 7 illustrates a schematic diagram of a mobile station quickly positioning a mobile station when all repeaters within a site are busy according to an embodiment of the present disclosure.

For example, a current site includes repeaters R1, R2, . . . , R6. Call address information loaded on the R1 includes G1 and G2 respectively. Call address information loaded on the R2 includes G3 and G4 respectively. Call address information loaded on the R3 includes G5 and G6 respectively. Call address information loaded on the R4 includes G7 and G8 respectively. Call address information loaded on the R5 includes G9 and G10 respectively. Call address information loaded on the R6 includes G11 and G12 respectively. Supposing the currently-residing repeater of the mobile station is R1, a call service needing to be accessed for the mobile station is G12 occurred on the repeater R6.

For a voice frame structure of the DMR, other control signalings (embedded signaling) may be embedded into intermediate 32 bits and transmitted together with voice. For a voice superframe structure of the DMR, a part of a voice link control (LC) frame may be respectively embedded into intermediate 32-bit locations of four voice frames and transmitted together with voice.

As shown in FIG. 7, both two slots of R1 are forwarding voice services, call information (for example, a repeater number and call address information) of R1 may be embedded into a first voice link control (LC) signaling. Call information of R2 and R3 is embedded into a second voice LC signaling. Afterward, call information of R1 is embedded into a next voice LC signaling, and call information of R4 and R5 is embedded into a still next voice LC signaling. By analogy, this is not finished until call information of R6 is embedded.

If the mobile station currently resides on the repeater R1, when all the repeaters within the site are busy, the mobile station does not need to be respectively switched to corresponding repeaters R2~R6 to conduct a search, but merely needing to reside on the current repeater to resolve voice LC embedded information. After receiving the fourth voice LC information, the terminal may position a call of the terminal on the R6 and may be directly switched to R6 to access the call of the terminal.

Definition of the embedded voice LC signaling information may be referred to Table 7, where "a busy repeater number", "a busy repeater call type" and "a target address" IE respectively represents different repeater numbers, call types thereon and call address information.

The mobile station may also continue monitoring priority call information in a short LC of CACH to determine whether a high-priority call is present. If a presence of a priority call is discovered in the short LC of CACH in a scanning process, the mobile station may be immediately switched to a corresponding repeater to access a priority call.

The DMR system is taken as an example to make a descriptive definition of the above signaling/information. However, it is to be noted that the above description is for illustration only and is not used to limit the present disclosure. In the DMR system, the site state information and/or priority call information and/or call address information may be defined as new signaling/information, or may also be implemented by adding the above information element (IE) into existing signaling/information in the DMR system. In addition, a signaling/information name and an IE named as used in the site state information and/or priority call information and/or call address information are used merely for convenience of description, represent signaling/information or information element having different corresponding functions in an information interaction process, and are not used for being able to limit the scope of application of the embodiment of the present disclosure. Namely, these names may be not used in some systems, but from this it cannot be considered that the technical solutions in the embodiment of the present disclosure cannot be applied to these systems.

As shown in FIG. 2, in Step S202, it is determined whether the currently-residing repeater forwards a call belonging to the mobile station. If there is a call belonging to the mobile station, Step S203 is executed, otherwise Step S201 is returned.

For example, the mobile station may determine whether there is a call belonging to the mobile station by determining "repeater call address" IE in the site state information. If the address is consistent with an address belonging to the mobile station, it is considered that there is a call belonging to the mobile station; otherwise, it is considered that there is no call belonging to the mobile station.

For another example, the mobile station may determine whether there is a call belonging to the mobile station by determining "priority call compressed address" IE in the priority call information. If the address is consistent with an address belonging to the mobile station, it is considered that there is a call belonging to the mobile station; otherwise, it is considered that there is no call belonging to the mobile station.

For another example, the mobile station may determine whether there is a call belonging to the mobile station by determining call address information forwarded by other repeaters in the embedded signaling in voice. If the address is consistent with an address belonging to the mobile station, it is considered that there is a call belonging to the mobile station; otherwise, it is considered that there is no call belonging to the mobile station.

The address belonging to the mobile station includes, for example, the address of the mobile station, the address of a group call to which the mobile station belongs, or the address of a general call.

As shown in FIG. 2, in Step S203, it is positioned and switched to a corresponding call repeater for a call access.

For example, the mobile station positions a repeater whose "call address" IE in the site state information is an address of the mobile station and is switched to this repeater to execute a call access.

For another example, the mobile station positions a repeater designated in "priority call repeater number" IE in the priority call information and is switched to this repeater to execute a priority call access.

For still another example, the mobile station positions a repeater whose call address in the embedded signaling in voice is an address of the mobile station and is switched to this repeater to execute a call access.

The site state information, priority call information and voice-embedded call information broadcast by a repeater may be provided through, for example, a site to which the repeater belongs. Namely, the site may send information of repeaters within the site, priority call information, information of free repeaters an all busy call information and so on to all the repeaters subordinated to the site periodically or when these information change, and these repeaters construct the site state information, the priority call information and voice-embedded call information according to the information.

Figure 8:
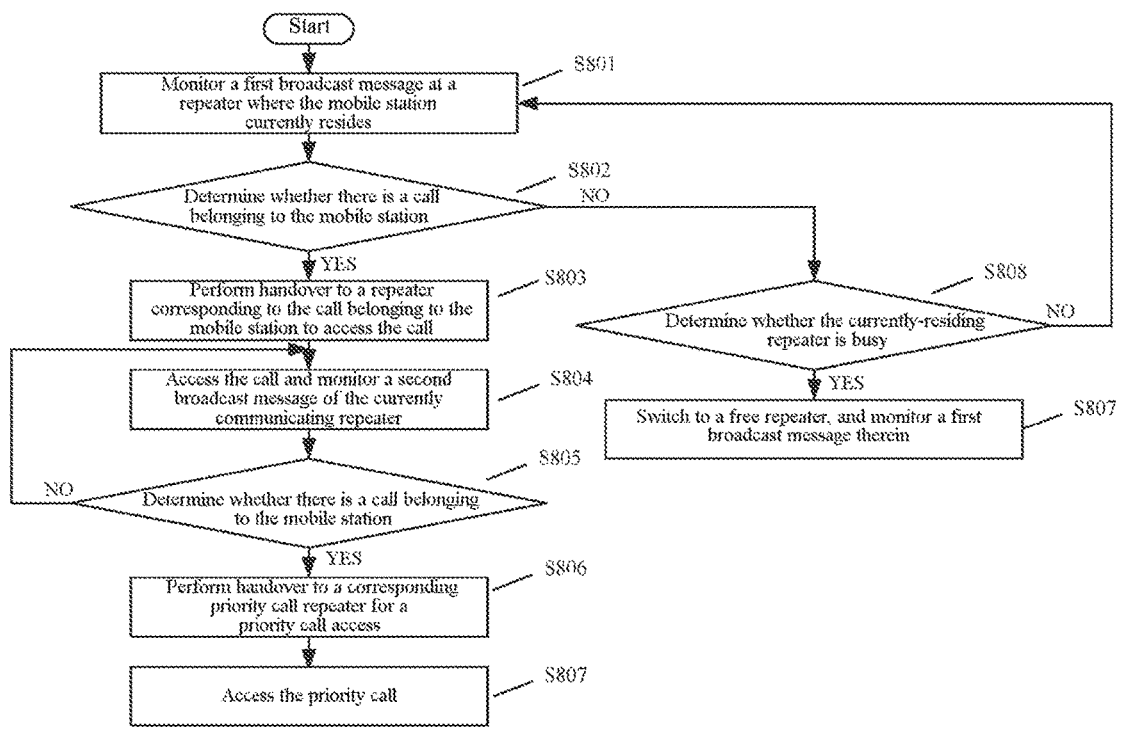
FIG. 8 illustrates a flowchart of a method for call positioning and accessing according to an embodiment of the present disclosure.

FIG. 8 illustrates a flowchart of a method for call positioning and accessing according to an embodiment of the present disclosure. As shown in FIG. 8, the method for positioning and accessing includes following steps.

Step S801: First broadcast information of a currently-residing repeater is monitored.

The currently-residing repeater may include a main repeater and a free repeater. As previously mentioned, if the main repeater of a talkgroup to which a mobile station belongs is idle, the mobile station always resides in the main repeater to monitor the first broadcast information. Otherwise, the mobile station resides in the current free repeater of a talkgroup to which the mobile station belongs to monitor the first broadcast information. Whereas, when the main repeater becomes idle, the mobile station returns to and resides in the main repeater.

According to an embodiment of the present disclosure, the first broadcast information includes site state information.

According to another embodiment of the present disclosure, the first broadcast information includes call address information.

Both the site state information and the call address information have been specified in the foregoing embodiment, and thus are not unnecessarily elaborated herein.

Step S802: It is determined whether there is a call belonging to the mobile station according to the first broadcast information. Step S803 is executed if there is a call belonging to the mobile station. Otherwise, Step S808 is executed.

Step S803: Positioning and handover are performed to a repeater corresponding to the call belonging to the mobile station to access the call according to the first broadcast information.

Step S804: The call is accessed and second broadcast information of the currently communicating repeater is monitored.

The second broadcast information includes priority call information.

The priority call information has been specified in the foregoing embodiment, and thus is not unnecessarily elaborated herein.

Step S805: It is determined whether there is a call belonging to the mobile station according to the second broadcast information. Step S806 is executed if there is a call belonging to the mobile station. Otherwise, it is returned to Step S804.

Step S806: Positioning and handover are performed to a repeater corresponding to the call belonging to the mobile station to access the call according to the second broadcast information.

Step S807: The priority call is accessed.

Step S808: It is determined whether the currently-residing repeater is busy, Step S809 is executed if the currently-residing repeater is busy; otherwise it is returned to Step S801.

As previously mentioned, the mobile station may, for example, determine whether the currently-residing repeater is busy according to states of repeaters in the site state information.

Step S809: It is switched to a free repeater, in which a first broadcast message is monitored.

As previously mentioned, the free repeater may be, for example, obtained through "free repeater number" IE in the site state information or the priority call information.

Figure 9:
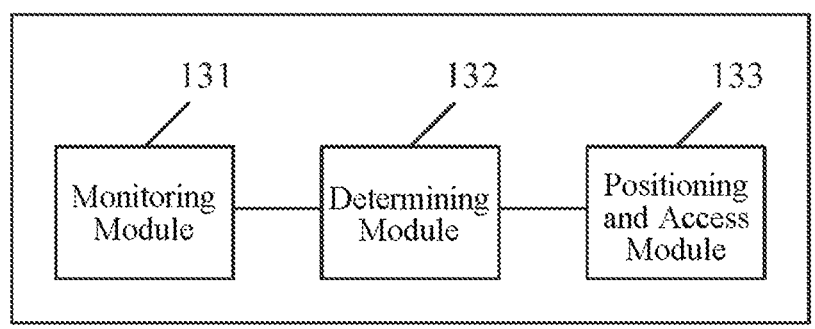
FIG. 9 illustrates a block diagram of a mobile station according to an embodiment of the present disclosure.

FIG. 9 illustrates a block diagram of a mobile station according to an embodiment of the present disclosure. As shown in FIG. 9, the mobile station 13 includes: a monitoring module 131, a determining module 132, and an access module 133.

The monitoring module 131 is configured to monitor broadcast information of a currently-residing repeater.

According to an embodiment of the present disclosure, the broadcast information includes, for example, site state information and priority call information.

The site state information is used for broadcasting state information of all repeaters within a site so that a mobile station subordinated to the site may learn about communication of all the repeaters within the site, and may timely learn whether there is a call belonging to the mobile station within the current site so that the mobile station may quickly perform handover to a repeater corresponding to the call to access the call. The site state information may be, for example, broadcast periodically.

The priority call information is used for broadcasting priority call information, including a free repeater number, a priority call repeater number and priority call address information within the site, etc. Taking a DRM system as an example, the priority call information may be sent through a short LC control signaling in a CACH, or may be sent through a voice link control signaling embedded into a voice link control header, or may be sent through a PreCSBK control signaling block.

According to another embodiment of the present disclosure, the broadcast information includes priority call information. When a mobile station is in a call-in-progress state, the mobile station may further continue monitoring the priority call information embedded into a service signaling to timely position and access a call having a higher priority. Still taking the DRM system as an example, the priority call information may be, for example, sent through a short LC control signaling in a CACH, or may be sent through a voice link control (LC) signaling embedded into a voice link control (LC) header, or may be sent through a PreCSBK.

According to still another embodiment of the present disclosure, the broadcast information includes call address information and priority call information. When the mobile station finds that all the repeaters within the site are busy by, for example, resolving that "a free repeater number" IE in the site state information is 0, the mobile station may continue monitoring the currently-residing cell and obtain call address information belonging to the mobile station to position and access a call belonging to the mobile station by resolving an embedded signaling in voice.

Still taking the DRM system as an example, the call address information is sent when all the repeaters within the site are busy, for example, sent through embedded voice link control signaling.

Furthermore, when all the repeaters within the site are busy, the mobile station may also continue monitor priority call information in a short LC of CACH to determine whether a high-priority call is present so that the mobile station may be immediately switched to a corresponding repeater to access a priority call.

The determining module 132 is connected to a monitoring module to receive broadcast information forwarded by the monitoring module, determine whether there is a call belonging to the mobile station among calls forwarded in the broadcast information, and send positioning information and an access indication to a positioning and access module 133 if there is a call belonging to the mobile station.

For example, the determining module 132 may determine whether there is a call belonging to the mobile station by determining "repeater call address" IE in the site state information. If the address is consistent with an address belonging to the mobile station, it is considered that there is a call belonging to the mobile station; otherwise, it is considered that there is no call belonging to the mobile station.

For another example, the determining module 132 may determine whether there is a call belonging to the mobile station by determining "priority call compressed address" IE in the priority call information. If the address is consistent with an address belonging to the mobile station, it is considered that there is a call belonging to the mobile station; otherwise, it is considered that there is no call belonging to the mobile station.

For another example, the determining module 132 may determine whether there is a call belonging to the mobile station by determining call address information forwarded by other repeaters in embedded signaling in voice. If the address is consistent with an address belonging to the mobile station, it is considered that there is a call belonging to the mobile station; otherwise, it is considered that there is no call belonging to the mobile station.

The address belonging to the mobile station includes, for example, the address of the mobile station, the address of a group call to which the mobile station belongs, or the address of a general call.

The access module 133 is connected to the determining module, and is switched to a corresponding repeater to execute a call access according to positioning information and access indication if the positioning information and the access indication of the determining module 132 are received.

Figure 12:
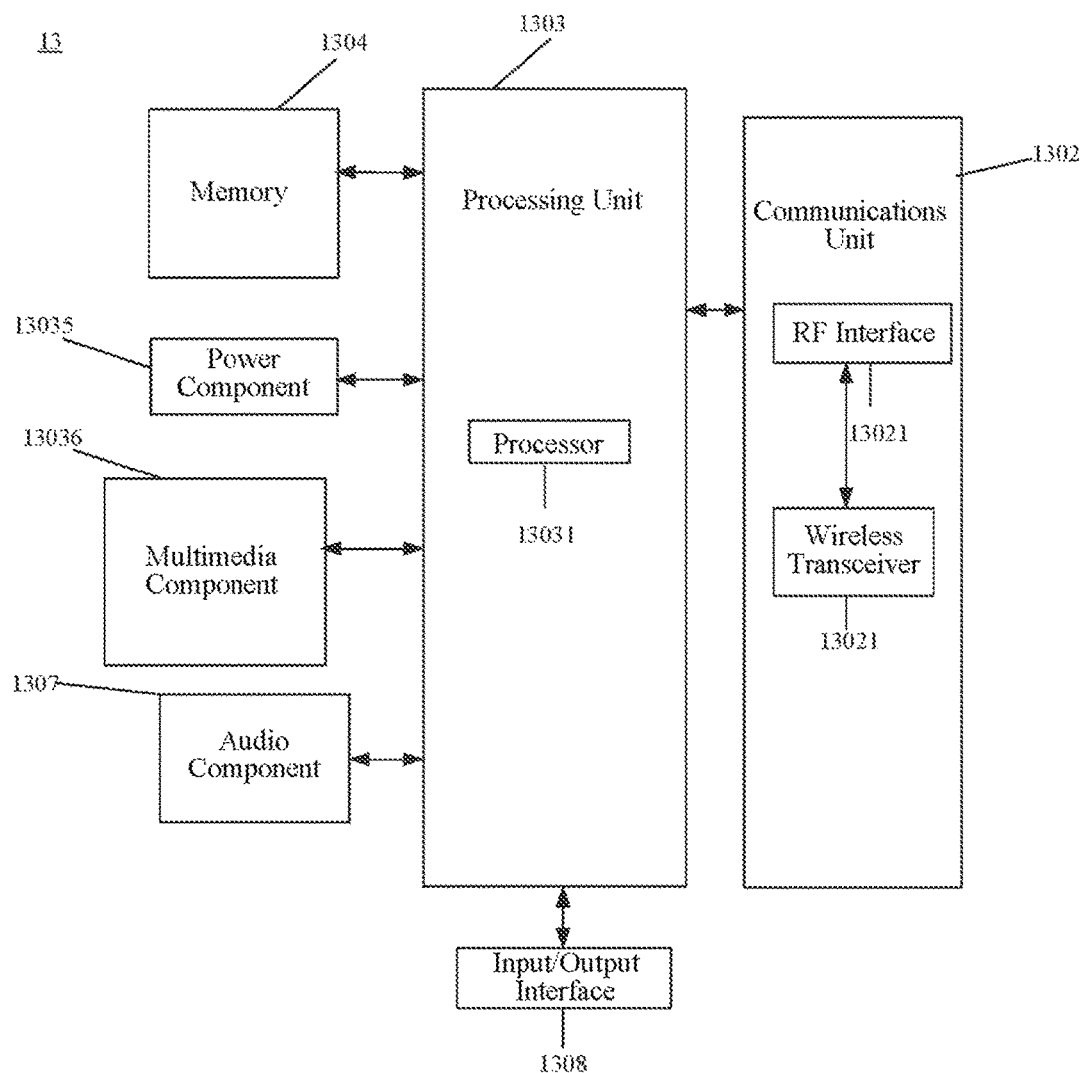
FIG. 12 illustrates a block diagram of a mobile station according to another embodiment of the present disclosure.

FIG. 12 illustrates a block diagram of a mobile station according to another embodiment of the present disclosure. As shown in FIG. 12, the mobile station 13 includes: a communication unit 1302, a processing unit 1303 and a memory 1304.

The communication unit 1302 may include at least one radio frequency (RF) interface 13021, which may be configured to carry out wireless communication with other mobile stations or repeaters. The communication unit 1302 may further include one or more wireless transceivers 13022, for example, digital mobile radio (DMR) transceivers, Trans-European Trunking Radio (TETRA) transceivers, P25 or APCO-25 transceivers, Bluetooth transceivers, Wi-Fi transceivers operated in accordance with IEEE802.11 (for example, 802.11a, 802.11b or 802.11g), WiMAX transceivers operated in accordance with IEEE802.16, and/or wireless transceivers operated in accordance with other wireless communication standards.

The processing unit 1303 typically controls overall operations of the mobile station 13, such as the operations associated with display, calls, data communication, and recording operations. The processing unit 1303 may include one or more processors 13031 to execute instructions to perform all or part of the steps in the above described methods. Moreover, the processing unit 1303 may include one or more modules which facilitate the interaction between the processing unit 1303 and other units.

The memory 1304 is configured to store various types of data to support the operation of the mobile station 13. Examples of such data include instructions for any applications or methods operated on the mobile station 13, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The mobile station 13 may further include a power component 1305, a multimedia component 1306, an audio component 1307, an input/output (I/O) interface 1308.

The power component 1305 provides power to various components of the mobile station 13. The power component 1305 may include a power management system, one or more power sources, and any other components associated with the generation, management, and distribution of power in the mobile station 13.

The multimedia component 1306 includes a screen providing an output interface between the mobile station 13 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio module 1307 is configured to output and/or input audio signals. For example, the audio component 1307 includes a microphone ("MIC") configured to receive an external audio signal when the mobile station 13 is in an operation mode, such as a call mode, a recording mode, and a voice recognition mode. The received audio signal may be further stored in the memory 1304 or transmitted via the communication unit 1302. In some embodiments, the audio component 1307 further includes a speaker to output audio signals.

The I/O interface 1308 provides interface for the processor unit 1303 and peripheral interface modules, the peripheral interface modules may be a keyboard, a click wheel and buttons, etc. The buttons may include, but are not limited to, a home button, a volume button, a starting button, and a locking button.

In some embodiments, the mobile station 13 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, the present disclosure also provides a non-transitory computer readable storage medium including instructions, such as included in the memory 1304, executable by the processor 13031 in the mobile station 13, for performing the above-described methods. For example, the non-transitory computer-readable storage medium may be a ROM, a RAM, a CD-ROM, a magnetic tape, a floppy disc, an optical data storage device, and the like.

The above method includes following steps.

Broadcast information of the currently-residing repeater for positioning and call accessing is monitored; when the main repeater is idle, the currently-residing repeater serves as the main repeater, and when the main repeater is busy, the currently-residing repeater serves as the free repeater.

It is determined whether there is a call belonging to the mobile station according to the broadcast information.

When it is determined that there is a call belonging to the mobile station, handover is performed, according to the broadcast information, to a repeater corresponding to the call belonging to the mobile station to access the call.

Figure 10:
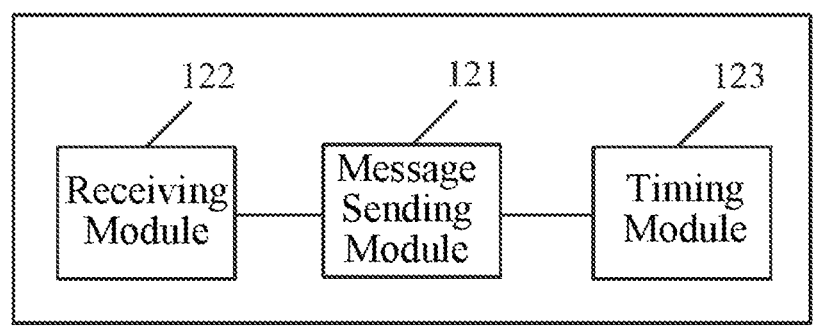
FIG. 10 illustrates a block diagram of a repeater according to an embodiment of the present disclosure.

FIG. 10 illustrates a block diagram of a repeater according to an embodiment of the present disclosure. As shown in FIG. 10, the repeater 12 includes: an information sending unit 121, a receiving unit 122 and a timing unit 123.

The information sending unit 121 is configured to broadcast site state information, priority call information, voice-embedded call address information.

When a state of the repeater is idle, the information sending unit 121 broadcasts the site state information and the priority call information.

When a state of the repeater is busy, the information sending unit 121 broadcasts the priority call information.

When receiving a site all busy indication, the information sending unit 121 broadcasts the priority call information and the voice-embedded call address information.

When receiving a site state signal timer timeout indication, the information sending unit 121 sends the site state information and the priority call information.

When receiving an individual call, general call or emergency call indication, the information sending unit 121 sends the site state information and the priority call information.

When receiving an indication of the group call of a group to which the repeater belongs, the information sending unit 121 sends the site state information and the priority call information.

The receiving unit 122 is connected to the information sending unit 121. When receiving individual call, general call or emergency call information, if the repeater is in a dormant state, the repeater is immediately awaked to send the individual call, general call or emergency call indication to the information sending unit 121. When receiving group call information of a group to which the repeater belongs and the repeater is the main repeater of this group, if the repeater is in a dormant state, the repeater is immediately awaked to send the group call indication of the group to the information sending unit 121. When receiving repeater all busy information in the site to which the repeater belongs, the repeater sends a repeater all busy indication in the site to the information sending unit 121.

The timer unit 123 is connected to the information sending unit 121. When the repeater is dormant, a site state signal timer is started. When the timer times out, the site state signal timer timeout indication is sent to the information sending unit 121. A length of time of the site state signal timer is, for example, a preset value.

Furthermore, the repeater further includes a generating unit, configured to generate the broadcast information according to states of repeaters within a site to which the repeater belongs and call related information.

Figure 13:
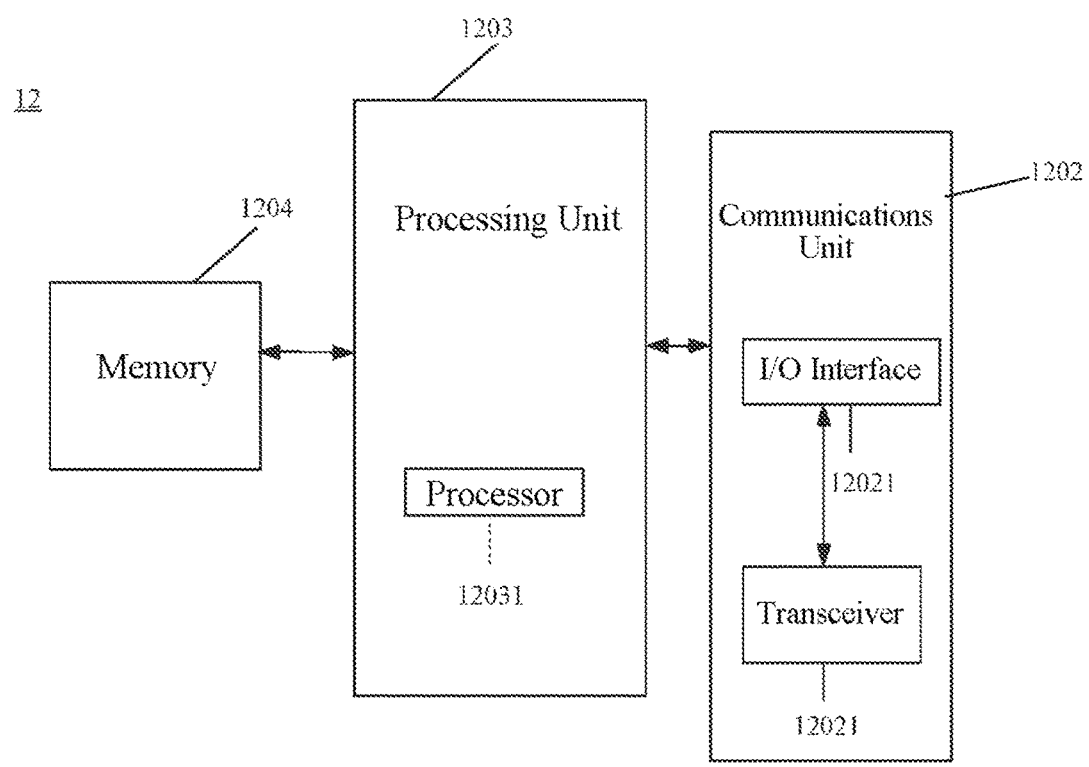
FIG. 13 illustrates a block diagram of a repeater according to another embodiment of the present disclosure.

FIG. 13 illustrates a block diagram of a repeater according to another embodiment of the present disclosure. As shown in FIG. 13, the repeater 12 includes: a communication unit 1202, a processing unit 1203 and a memory 1204.

The communication unit 1202 may include at least one wired or wireless input/output (I/O) interface 12021, which may be configured to carry out communication with a mobile station or other repeaters. The communication unit 1202 may further include at least one wired or wireless transceiver 12022, where the wireless transceivers may be, for example, digital mobile radio (DMR) transceivers, Trans-European Trunking Radio (TETRA) transceivers, P25 or APCO-25 transceivers, Bluetooth transceivers, Wi-Fi transceivers operated in accordance with IEEE802.11 (for example, 802.11a, 802.11b or 802.11g), WiMAX transceivers operated in accordance with IEEE802.16, and/or wireless transceivers operated in accordance with other wireless communication standards. Wired transceivers may be, for example, Ethernet transceivers, Universal Serial Bus (USB) transceivers, or similar transceivers configured to communicate through similar physical connection of twisted-pairs, coaxial cables, optical fiber links or wired line networks.

The processing unit 1203 typically controls overall operations of the repeater 12, such as the operations associated with communication and recording operations. The processing unit 1203 may include one or more processors 12031 to execute instructions to perform all or part of the steps in the above described methods. Moreover, the processing unit 1203 may include one or more modules which facilitate the interaction between the processing unit 1203 and other units.

The memory 1204 is configured to store various types of data to support the operation at the repeater 12. Examples of the data include any application program or approach directive for operation of the repeater 12. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In some embodiments, the repeater 12 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, the present disclosure also provides a non-transitory computer readable storage medium including instructions, such as included in the memory 1204, executable by the processor 12031 in the mobile station 12, for performing the above-described methods. For example, the non-transitory computer-readable storage medium may be a ROM, a RAM, a CD-ROM, a magnetic tape, a floppy disc, an optical data storage device, and the like.

The above method includes following steps.

In each site, when a repeater subordinated to the site is idle, the site state information and priority call information are sent to respectively notify states of all repeaters within the site and priority call related information; and/or when a repeater subordinated to the site is busy, the priority call information is sent to notify the priority call related information; and/or when all the repeaters subordinated to the site are busy, the voice-embedded call address information is sent to notify call information of the repeater and other repeaters.

According to the present disclosure, firstly, by designing various broadcast information and broadcast the information in different scenarios, the call information may be acquired by the mobile station under any circumstances and under any repeater to accurately position and access a call of the repeater, reduce a possibility of call lose, allow a system to support multi-call at the same moment and reduce a probability of system access conflict. Secondly, through broadcast of priority call information, the mobile station may quickly position and access a call having a high priority in a call process, thereby guaranteeing a reliability of a high priority service. Thirdly, through broadcast of voice-embedded call address information, the mobile station may continue reside in a currently-residing cell to receive call information of other repeaters, thereby achieving the objective of timely positioning and access call and reducing an access delay.

The aforementioned solutions are merely exemplary embodiments of the present disclosure, to which the present disclosure is not limited. The technical solutions of the present disclosure may be applied to any time division multiple access digital communication system. Within the scope of instruction and spirit of the present disclosure, equivalent substitution or modification of any system solution or cascade mode modification of a repeater shall fall within the scope of the claims of the present disclosure.

The exemplary embodiment of the present disclosure are shown and described above in detail. It shall be understood that the present disclosure is not limited to the disclosed embodiment, and instead, the present disclosure intends to encompass various modifications and equivalent replacements within the scope of the appended claims.

What is claimed is:

1. A communication method for a mobile station, used in a trunking communication system, comprising:
   monitoring broadcast information sent by a currently-residing repeater, wherein the broadcast information carries state information of repeaters within a site and call related information, and a main repeater of the mobile station belongs to the site;
   acquiring a state of the main repeater according to the broadcast information, wherein when the main repeater is idle, the currently-residing repeater serves as the main repeater, and when the main repeater is busy, the currently-residing repeater serves as a free repeater, the free repeater being a predetermined repeater with an idle state within the site;
   determining whether there is a call belonging to the mobile station according to the call related information; and
   when determining that there is a call belonging to the mobile station, performing handover, according to the call related information, to a repeater corresponding to the call belonging to the mobile station to access the call.

2. The communication method according to claim 1, wherein the broadcast information comprises site state information;
   the site state information at least comprises: call target address information of all repeaters within the site; and
   the determining whether there is a call belonging to the mobile station comprises: determining whether there is a call belonging to the mobile station according to the call target address information of each repeater.

3. The communication method according to claim 2, wherein the site state information further comprises: service states of all the repeaters within the site and free repeater number information;
   the acquiring a state of the main repeater according to the broadcast information comprises: determining the state of the main repeater according to a service state of the main repeater among the service states of all the repeaters; and
   acquiring the free repeater according to the free repeater number information.

4. The communication method according to claim 1, wherein the broadcast information comprises priority call information;
   the priority call information at least comprises: a priority call repeater number and priority call target address information; and
   the determining whether there is a call belonging to the mobile station comprises: determining whether there is a call belonging to the mobile station according to the priority call target address information; and when determining that there is a call belonging to the mobile station, the repeater corresponding to the call belonging to the mobile station is indicated by the priority call repeater number.

5. The communication method according to claim 1, wherein the broadcast information comprises voice-embedded call address information and priority call information;
   the voice-embedded call address information comprises a repeater number and call address information in an embedded signaling embedded in voice; and
   the determining whether there is a call belonging to the mobile station comprises: determining whether there is a call belonging to the mobile station according to the call address information; and when determining that there is a call belonging to the mobile station, the repeater corresponding to the call belonging to the mobile station is indicated by the repeater number.

6. The communication method according to claim 1, further comprising: continuing monitoring the broadcast information sent by the currently-residing repeater when learning that all repeaters within the site are busy according to the broadcast information.

7. The communication method according to claim 6, wherein the state information of repeaters comprises free repeater number information, and the learning that all repeaters within the site are busy according to the broadcast information comprises: determining whether all the repeaters within the site are busy according to the free repeater number information.

8. A mobile station, used in a trunking communication system, comprising:
a processor, and
a memory configured to store instructions executable by the processor; wherein
according to the executable instructions, the processor is configured to:
monitor broadcast information sent by a currently-residing repeater, wherein the broadcast information carries state information of repeaters within a site and call related information, and a main repeater of the mobile station belongs to the site;
acquire a state of the main repeater according to the broadcast information, wherein when the main repeater is idle, the currently-residing repeater serves as the main repeater, and when the main repeater is busy, the currently-residing repeater serves as a free repeater, the free repeater being a predetermined repeater with an idle state within the site;
determine whether there is a call belonging to the mobile station according to the call related information; and
when determining that there is a call belonging to the mobile station, perform handover, according to the call related information, to a repeater corresponding to the call belonging to the mobile station to access the call.

9. The mobile station according to claim 8, wherein the broadcast information comprises site state information;
the site state information at least comprises: call target address information of all repeaters within the site to which the mobile station belongs; and
the determining by the processor whether there is a call belonging to the mobile station comprises: determining whether there is a call belonging to the mobile station according to the call target address information of each repeater.

10. The mobile station according to claim 8, wherein the broadcast information comprises priority call information;
the priority call information at least comprises: a priority call repeater number and priority call target address information; and
the determining by the processor whether there is a call belonging to the mobile station comprises: determining whether there is a call belonging to the mobile station according to the priority call target address information; and when determining that there is a call belonging to the mobile station, the repeater corresponding to the call belonging to the mobile station is indicated by the priority call repeater number.

11. The mobile station according to claim 8, wherein the broadcast information comprises voice-embedded call address information and priority call information;
the voice-embedded call address information comprises a repeater number and call address information in an embedded signaling embedded in voice; and
the determining by the processor whether there is a call belonging to the mobile station comprises: determining whether there is a call belonging to the mobile station according to the call address information; and when determining that there is a call belonging to the mobile station, the repeater corresponding to the call belonging to the mobile station is indicated by the repeater number.

* * * * *